US008530846B2

(12) United States Patent
Cook et al.

(10) Patent No.: US 8,530,846 B2
(45) Date of Patent: Sep. 10, 2013

(54) APPARATUS AND METHODS FOR DETECTOR SCATTER RECOVERY FOR NUCLEAR MEDICINE IMAGING SYSTEMS

(75) Inventors: Michael Joseph Cook, Oconomowoc, WI (US); David Leo McDaniel, Dousman, WI (US)

(73) Assignee: General Electric Company, Schenectady, NY (US)

(*) Notice: Subject to any disclaimer, the term of this patent is extended or adjusted under 35 U.S.C. 154(b) by 661 days.

(21) Appl. No.: 12/646,913

(22) Filed: Dec. 23, 2009

(65) Prior Publication Data

US 2011/0150181 A1    Jun. 23, 2011

(51) Int. Cl.
  *G01T 1/20*  (2006.01)
(52) U.S. Cl.
  USPC ..................................... 250/363.01
(58) Field of Classification Search
  USPC ..................................... 250/363.01
  See application file for complete search history.

(56) References Cited

U.S. PATENT DOCUMENTS

| | | | |
|---|---|---|---|
| 5,841,140 A * | 11/1998 | Mc Croskey et al. | 250/363.03 |
| 6,346,706 B1 * | 2/2002 | Rogers et al. | 250/363.04 |
| 6,512,232 B2 * | 1/2003 | Pehl et al. | 250/369 |
| 6,791,090 B2 | 9/2004 | Lin et al. | |
| 6,921,902 B2 | 7/2005 | Chuang et al. | |
| 7,617,080 B2 | 11/2009 | Barbour et al. | |
| 7,639,856 B2 | 12/2009 | Inoue et al. | |
| 8,017,914 B2 * | 9/2011 | Wollenweber et al. | 250/363.04 |
| 2003/0075685 A1 * | 4/2003 | Yamakawa | 250/370.11 |
| 2008/0230702 A1 | 9/2008 | Rousso et al. | |
| 2009/0114826 A1 | 5/2009 | Takahashi et al. | |
| 2009/0247847 A1 | 10/2009 | Pogue et al. | |
| 2010/0034353 A1 | 2/2010 | Kravis et al. | |

OTHER PUBLICATIONS

Jean-Baptiste Michaud et al. "Sensitivity in PET: Neural networks as an alternative to compton photons LOR analysis", IEEE Nuclear Science Symposium Conference Record (2007).*
Masazumi Ohtani et al, "Improvement of Detection Efficiency in Coincidence Data Acquisition with CdTe Detector", IEEE Nuclear Science Symposium and Medical Imaging Conference (2000).*

* cited by examiner

*Primary Examiner* — David Porta
*Assistant Examiner* — Edwin Gunberg
(74) *Attorney, Agent, or Firm* — The Small Patent Law Group; Dean D. Small (57) ABSTRACT

Apparatus and methods for detector scatter recovery for positron emission tomography systems are provided. One method includes identifying detected gamma events in different detector units of a nuclear medicine (NM) imaging detector and determining whether the detected gamma events occurred within a predetermined time period and have a summed energy of at least a predetermined level to define gamma events for reconstitution. The method further includes reconstituting the defined gamma events into single valid gamma events.

17 Claims, 12 Drawing Sheets

APPARATUS AND METHODS FOR DETECTOR SCATTER RECOVERY FOR NUCLEAR MEDICINE IMAGING SYSTEMS

BACKGROUND OF THE INVENTION

The subject matter disclosed herein relates generally to diagnostic imaging systems, and more particularly to nuclear medicine (NM) imaging systems such as positron emission tomography (PET) imaging systems and scatter recovery for detectors of the imaging systems.

PET imaging systems typically generate images depicting the distribution of positron-emitting nuclides in patients. The positron interacts with an electron in the body of the patient by annihilation, with the electron-positron pair converted into two photons. The photons are emitted in opposite directions along a line of response. The annihilation photons are detected by detectors (that are typically in a detector ring assembly) on both sides of the line of response on the detector ring assembly. These detections are termed coincidence events. The coincidence events detected by the PET detector ring assembly are typically stored within data structures called emission sinograms, which is a histogram of the detected coincidence events. An image of the activity distribution within a patient's body is generated from the emission sinograms through a process called image reconstruction.

In PET imaging systems having multiple detector units (detector units with dedicated event detection circuitry), the incident gamma ray can interact in the scintillator of a detector unit resulting in a lower energy scattered gamma ray. If the scattered gamma ray leaves the scintillator block of the detector unit, the gamma ray will produce an event with an energy equal to the difference between the incident gamma ray's energy and the energy of the scattered gamma ray. If the scattered gamma ray interacts in the scintillator of a neighboring detector unit, the gamma ray may produce a second event with an energy equal to the scatter gamma ray's energy. The partial energy events are often discarded by conventional PET imaging systems as potentially representing scatter from a source other than the detector (e.g., patient scatter or object in the detector field of view). Gamma rays that scatter before reaching the detector unit should be rejected since the gamma rays will provide misinformation with respect to the line of response of the gamma rays. Accordingly, the sensitivity of the PET system is decreased.

BRIEF DESCRIPTION OF THE INVENTION

In accordance with various embodiments, a method for detector scatter recovery acquisition is provided. The method includes identifying detected gamma events in different detector units of a nuclear medicine (NM) imaging detector and determining whether the detected gamma events occurred within a predetermined time period and have a summed energy of at least a predetermined level to define gamma events for reconstitution. The method further includes reconstituting the defined gamma events into single valid gamma events.

In accordance with other embodiments, a computer readable medium for providing detector scatter recovery acquisition for a nuclear medicine (NM) imaging system having a plurality of detector modules each including a plurality of detector units is provided. The computer readable medium is programmed to instruct a computer to identify a scattered gamma event detected by two adjacent modules of the plurality of modules and reconstitute the scattered gamma event as a valid gamma event.

In accordance with yet other embodiments, a nuclear medicine (NM) imaging system is provided that includes an imaging portion comprising a plurality of multi-unit detector modules for detecting gamma events, with each having a plurality of detector units. Additionally, each of the detector units further includes an array of scintillator crystals, light sensor devices, and event detection circuitry. The NM imaging system further includes a processing portion configured to determine a scattered gamma event detected by multi-detector units in one or more of the multi-unit detector modules and reconstitute the scattered gamma event as a valid gamma event.

DETAILED DESCRIPTION OF THE INVENTION

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Also as used herein, the phrase "reconstructing an image" is not intended to exclude embodiments in which data representing an image is generated, but a viewable image is not. Therefore, as used herein the term "image" broadly refers to both viewable images and data representing a viewable image. However, many embodiments generate, or are configured to generate, at least one viewable image.

Various embodiments provide methods for detector scatter recovery by correcting for photon detector scatter in nuclear medicine (NM) imaging systems, such as positron emission tomography (PET) imaging systems. For example, in PET detector assemblies, for PET detector rings formed from multiple detector units, the various embodiments reconstitute into valid single events (events representing, for example, a 511 keV gamma ray) gamma events that interact with two or more neighboring detector units. Thus, gamma scatter due to the interaction of two detector units is reconstituted as a single un-scattered gamma event. The energy, timing and positional assignment to a detector unit and the relative location within the unit of a reconstituted event is determined from this energy, timing and positional assignment information measured in the two detector units.

A technical effect of at least one embodiment is improved detection sensitivity from increased valid photon counts. Improved detection sensitivity results in improved image quality, as well as enables a detector material cost trade-off.

The various embodiments are described herein as implemented in connection with a PET imaging system. However, it should be appreciated that although the various embodiments are described in connection with a PET imaging system having a particular configuration, the various embodiments may be implemented in connection with PET imaging systems have different configurations and components, as well as with other types of single or dual-modality imaging systems, for example, a single photon emission computed tomography (SPECT) imaging system. Moreover, the imaging detectors may be of different types and configurations.

Figure 1:
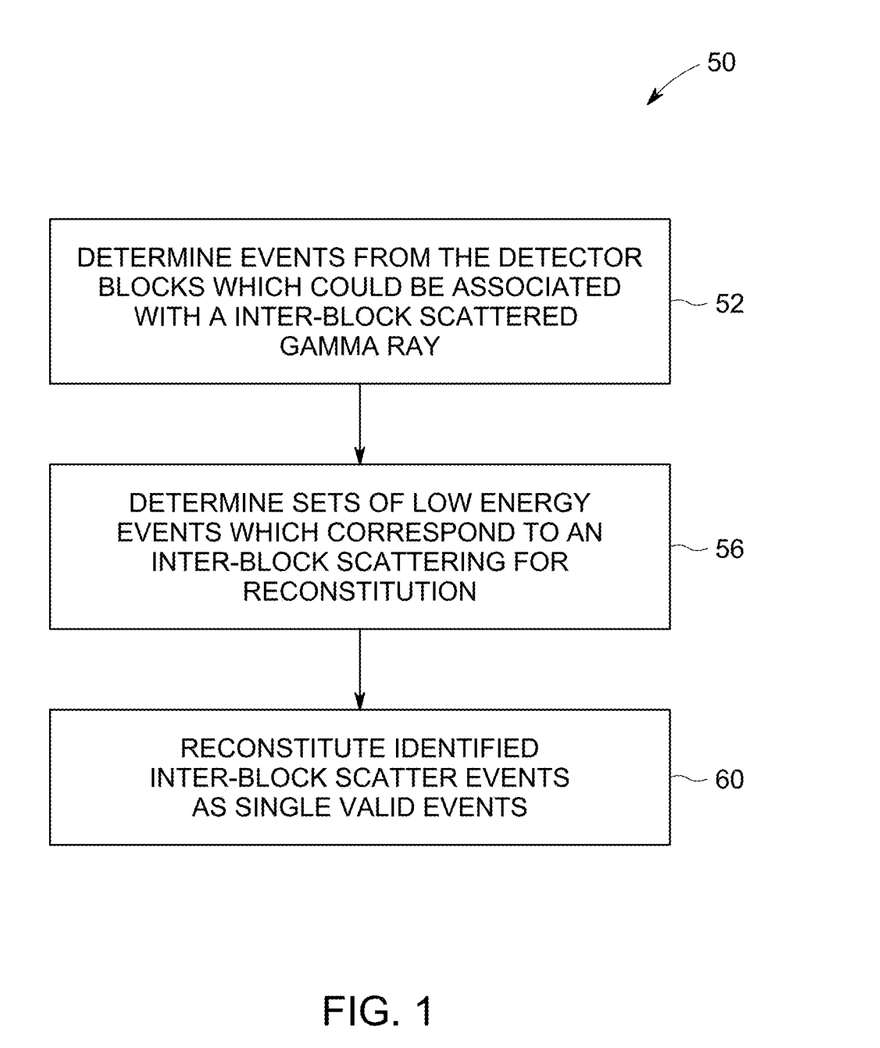
FIG. 1 is a flowchart of a method for detector scatter recovery acquisition in accordance with various embodiments.
Figure 2:
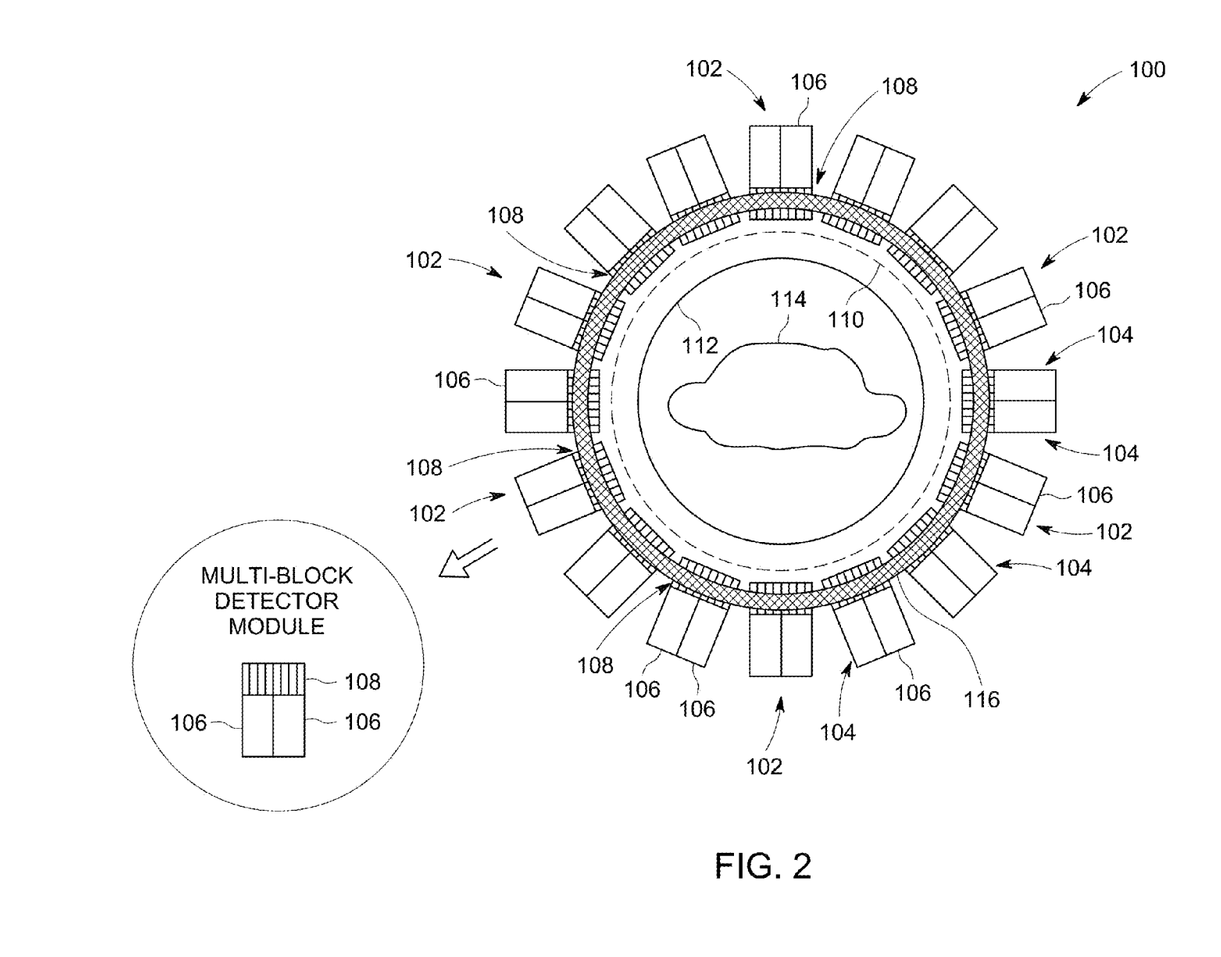
FIG. 2 is a schematic block diagram illustrating a detector ring of positron emission tomography PET imaging system in which various embodiments may be implemented.

In accordance with various embodiments, a method 50 for detector scatter recovery acquisition is provided as illustrated in FIG. 1. The method 50 may be implemented in connection with PET imaging systems to reduce the number of discarded scatter events from the PET detector, such as scatter at the detector scintillator crystals. For example, as shown in FIG. 2, illustrating a PET detector imaging portion, and more particularly, a PET detector ring 100, the method 50 may provide detector scatter recovery acquisition in connection therewith. It should be noted that although a single detector ring 100 is shown, a plurality of detector rings 100 may be provided, for example, aligned axially, in a single PET imaging system.

As shown in FIG. 2, the detector ring 100 includes a plurality of multi-unit detector modules 102, which may be positioned uniformly about the detector ring 100. The plurality of multi-unit detector modules 102 may each be spaced apart from one another (as illustrated) or may be positioned substantially adjacent or abutting one another. Each multi-unit detector module 102 includes one or more detector units 104, each of which includes one or more light sensor devices 106 and a corresponding plurality of scintillators 108. The light sensor devices 106 can be any of the any of the light sensors used in NM, for example, multiple photomultiplier tubes (PMT), a multi-anode PMT, or a silicon device such as an avalanche photo diode operating in the Geiger mode. The scintillators 108 are crystals that are arranged in a two-dimensional array (also referred to as a block or crystal block) of, for example, nine crystals in the circumferential direction around the detector ring and nine crystals in the axial direction from the front to the back of the PET imaging system.

The detector ring 100 is configured having a circular orbit 110 on which a positron emitting rod source may be rotated during a rotating rod normalization process used for calibration. A patient bore 112 is provided in which a patient 114 is positioned, and moved axially to perform a PET scan of the patient 114 using any known PET scanning or imaging process. The various embodiments, including the method 50 provide scatter recovery for scatter along a region identified as 116 in FIG. 2, which generally corresponds to scatter originating in the plurality of multi-unit detector modules 102, including from the plurality of scintillators 108.

Figure 3:
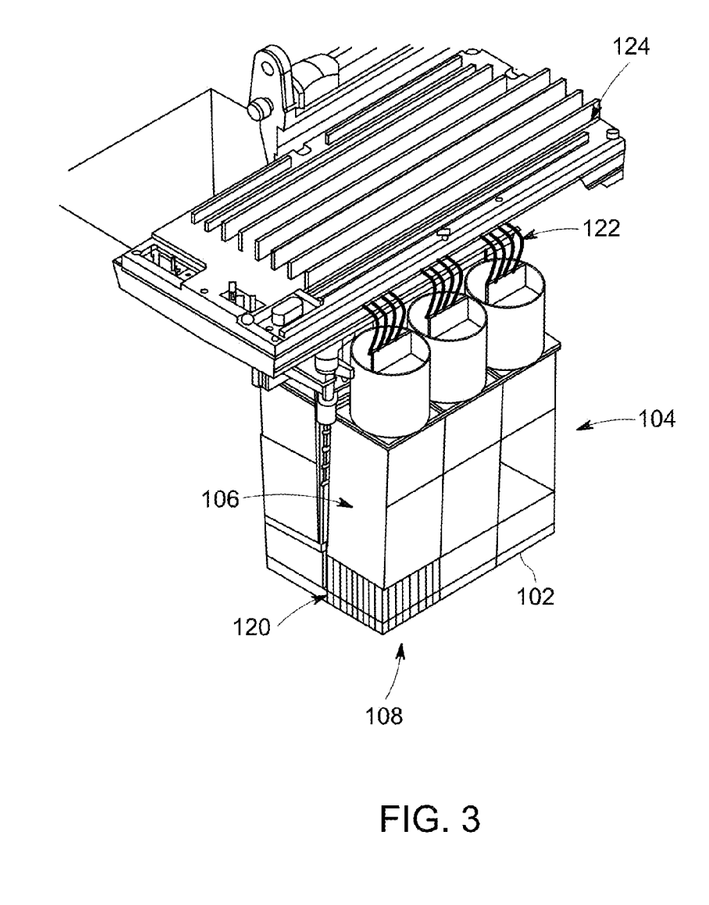
FIG. 3 is a diagram of a multi-unit detector module of the detector ring of FIG. 2.

Thus, as shown in FIG. 3, each detector ring 100, which may form a detector ring assembly, includes a plurality of multi-unit detector modules 102 that include one or more detector units 104. The multi-unit detector modules 102 also include one or more scintillators 108, illustrated as bismuth germinate (BGO) crystals 120. The plurality of multi-unit detector modules 102 are configured in some embodiments as PET cameras. Each BGO crystal 120 is disposed in front of one of the quad-anode light sensor devices 106. More than one BGO crystal 120 may be disposed in front of a given light sensor device 106. For example, in some embodiments (as shown in FIG. 3) a matrix of eighty-one BGO crystals 120 is disposed in front of a quad-anode light sensor device 106. All of the light sensor devices 106 produce analog signals on line 122 when an event occurs at one of the respective eighty-one BOO crystals 120 that are disposed in front of the light sensor devices 106 (e.g., when a gamma photon is detected by one of the BGO crystals 120). It should be noted that in various embodiments there is one set of electronics, for example, dedicated event detection circuitry 124 for each multi-unit detector module 102. For each gamma ray detected by one of the detector units 104 within the detector module 102, the dedicated event detection circuitry 124 produces signals (e.g., digital signals) that include the detector unit 102 in which the event was detected, the crystal 120 in the detector unit to which the event was assigned, the energy of the event, and time (relative to a master system clock) when the event was detected.

A set of acquisition circuits (not shown) are also mounted within a gantry (not shown) of the imaging system to receive the signals detected by the multi-unit detector modules 102 and to convert the signal into a sinogram. It should be noted that detector scatter as used herein refers to scatter resulting from gamma interaction with the detector scintillators 108.

Referring again to the method 50 of FIG. 1, the detector scatter recovery acquisition process uses information regarding detector scatter where partial energy of a given gamma is scattered between adjacent crystal blocks of a detector module. Thus, for PET imaging, it is assumed that 511 keV gammas entering a crystal for a given detector unit, but scattered to a crystal of an neighbor detector unit, results in two low energy events detected by the neighboring units, which may or may not be adjacent units. In accordance with various embodiments, these detector scatter events are not discarded, but reconstituted into valid positron annihilation photon events.

Figure 4:
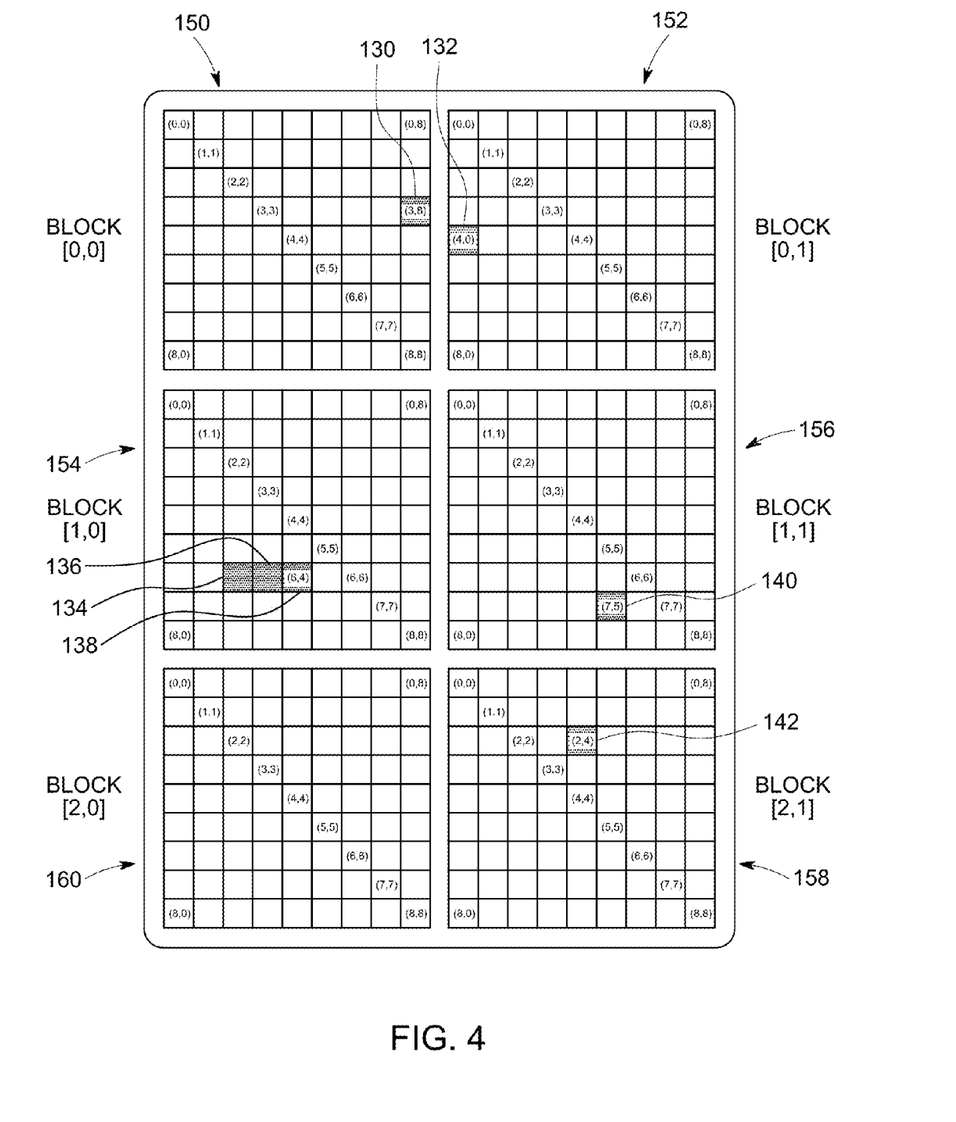
FIG. 4 is a diagram of a multi-unit detector module illustrating scattered events.

Accordingly, at 52 of the method 50, candidates for detector scatter events are identified. For example, as shown in the multi-unit detector module illustrated in FIG. 5, which may be the multi-unit detector module 102, different detection events are evaluated as described in more detail below to determine whether the event qualifies as a detector scatter event. For example, FIG. 4 illustrates three different exemplary events, namely potential detector scatter events for correction on a 2×3 multi-unit detector module with 9×9 crystals per unit, as follows:

(a) An inter-block detector scatter with partial energy measured in Crystal (3,8) of Unit [0,0] and Crystal (4,0) of Unit [0,1], identified as crystals 130 and 132, respectively in unit 150 and 152, respectively.

(b) An intra-block multi-crystal detector scatter involving crystals (6,2), (6,3) and (6,4) of Block [1,0], identified as crystals 134, 136 and 138, respectively, in unit 154 and leading to a single assigned single event output with energy and position assigned to Crystal (6,4) of Unit [1,0].

(c) An inter-block detector scatter with partial energy measured in Crystal (7,5) of Unit [1,1] and Crystal (4,0) of Unit [2,1], identified as crystals 140 and 142, respectively in units 156 and 158, respectively.

It should be noted that there are no detected events in unit 160 in the illustrated example.

Each of these events, (a), (b) and (c) are examples of detector scatter events. Event (b) is identified as an intra-unit scatter event as the gamma scatter at crystals 134, 136 and 138 are contained within a single detector unit. These types of intra-unit scatter events are not reconstituted in accordance with various embodiments. Detector scatter events like event (b) that stay in-block are likely to be qualified as valid singles events because the total energy measured by the unit will still be close to 511 keV when measured by the dedicated set of electronics for that detector unit. Intra-block detector scatter as illustrated by event (b) may, however, result in a miss-positioned event. While inter-block scattering event (a) can be described as a gamma ray scattering in crystal 130 and the scattered gamma ray interacting in crystal 132, or as a gamma ray scattering in crystal 132 and the scattered gamma ray interacting in crystal 130, the interaction in either or both units 150 and 152 could be an intra-unit scatter that was assigned to the corresponding crystal in the block.

The method 50 then separates detected events into one of plurality of groups, for example, three groups based on the energy of the detected event. For example, in some embodiments, events with energies within a predetermined window (e.g., 425 keV to 650 keV) are assigned to a first group of events, events with energies within a second predetermined value (e.g., 50 keV) are assigned to a second group of events, and events with energies below the first predetermined window and above the second predetermined value are assigned to a third group of events. Events in the first group are identified as valid positron annihilation photon events and are forwarded without further processing. If an event in the second group is part of an inter-block scattered event, there is a high probability that either the initial gamma ray was a low energy gamma ray from scatter outside the detector or the other event in the inter-block scatter had energy sufficient to be assigned to the first group. Accordingly, events in the second group are rejected. Events in the third group are identified as possible events from an inter-block scatter and are further processed as described herein. In some embodiments, additional filtering of the third group may be performed to further reduce the number of events that need further processing.

Figure 9:
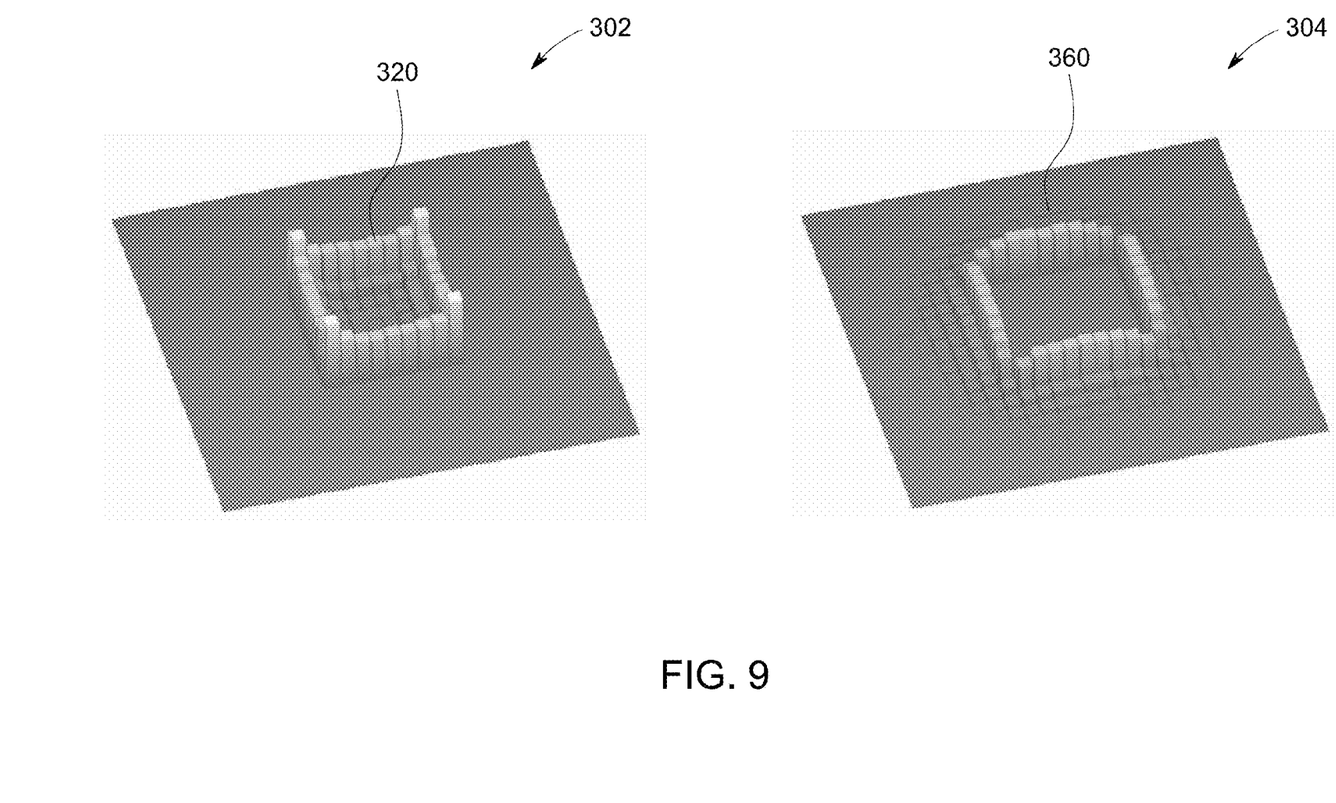
FIG. 9 is a plot illustrating the number of the detected gamma ray events that have one inter-block scatter as functions of the position

In some embodiments, other criteria may be used to determine whether a low energy event should be forward for further processing to determine if the event is a member of a detector scatter event. For example, the location of the detected events within the unit and the location of the unit in the multi-unit module can be used to reject events that have a low probability of being part of an inter-block scatter event. The plot 302 of FIG. 9 shows that the location (identified as 320) of the initial interaction of an inter-block scatter is more likely to be found near the edge of the block than near the center of the block. Likewise, the plot 304 shows that the location (identified as 360) of a scattered gamma ray in an inter-block scatter event is more likely to be located near the edge of the block adjacent to the block in which the initial event was detected. FIG. 9, thus, illustrates where the initial gamma ray interaction was detected and the position where the scattered gamma ray event was detected. The values were determined from a Monte Carlo Calculation of a 3×3 array of detector units. The blocks of each detector unit were formed of a 9×9 array of 4.2 mm×4.2 mm×30.0 mm Bismuth Germinate (BGO) crystals with 511 keV gamma rays incident uniformly on the center detector unit and parallel to the long axis of the crystals.

Figure 10:
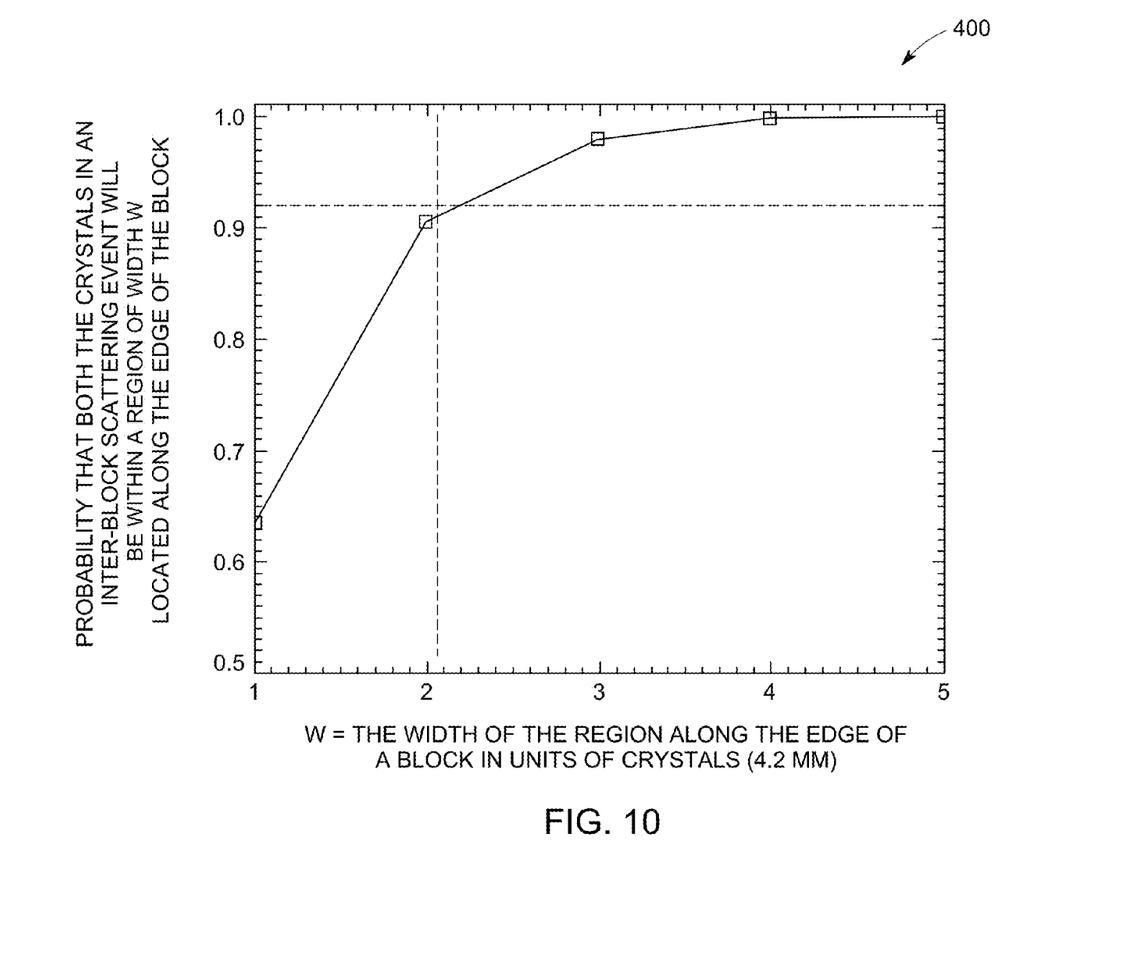
FIG. 10 is a plot of the probability that both crystals in an inter-block scattering event will be with in a region located along the edge of the block.

FIG. 10 shows a graph 400 illustrating that more than 90% of the inter-block scattered events both of the low energy events were detected in crystals that where within 8.2 mm of the edge of the blocks. The data is from the Monte Carlo Calculation described above.

Figure 6:
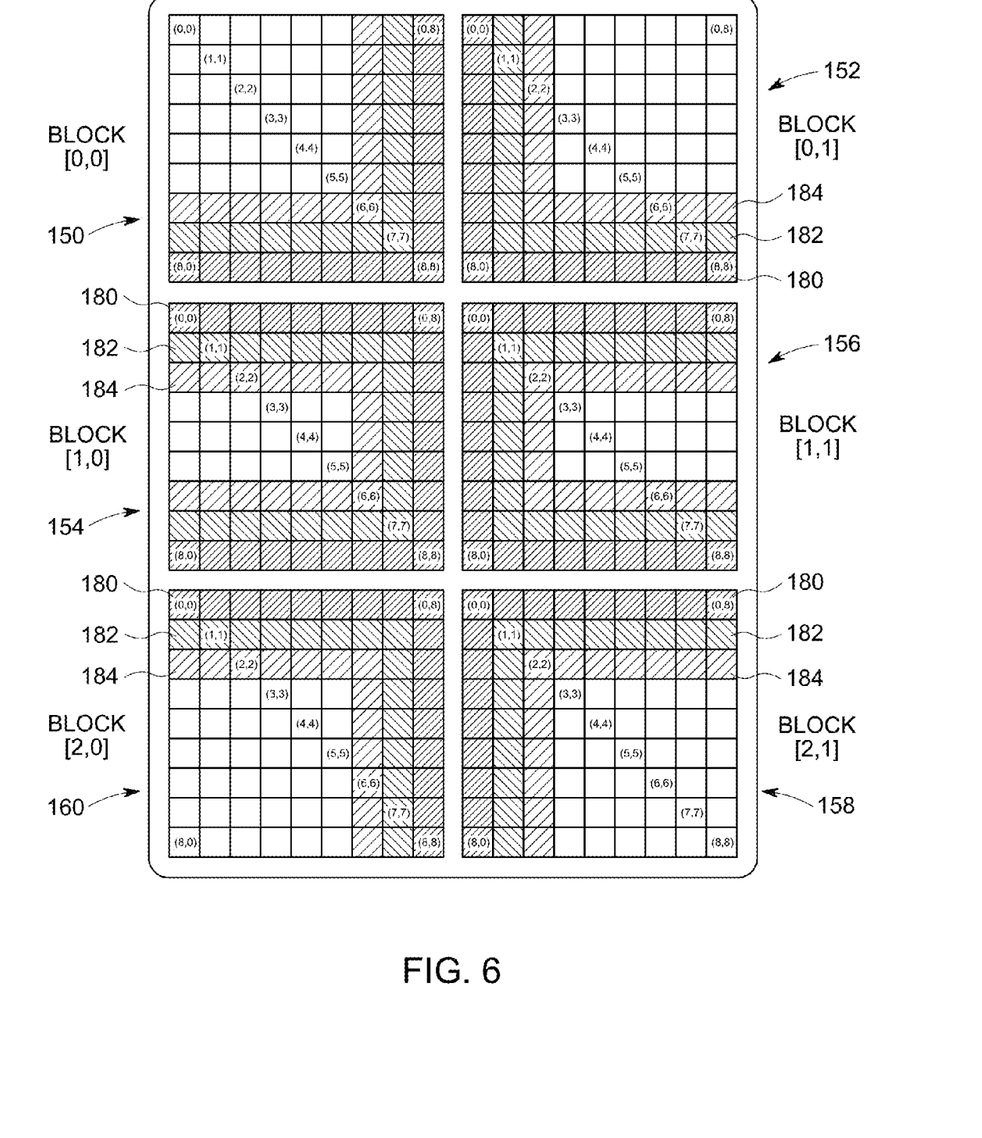
FIG. 6 is a diagram of a multi-unit detector module illustrating an embodiment for rejecting scattered events for reconstitution based on a detector crystal location.
Figure 7:
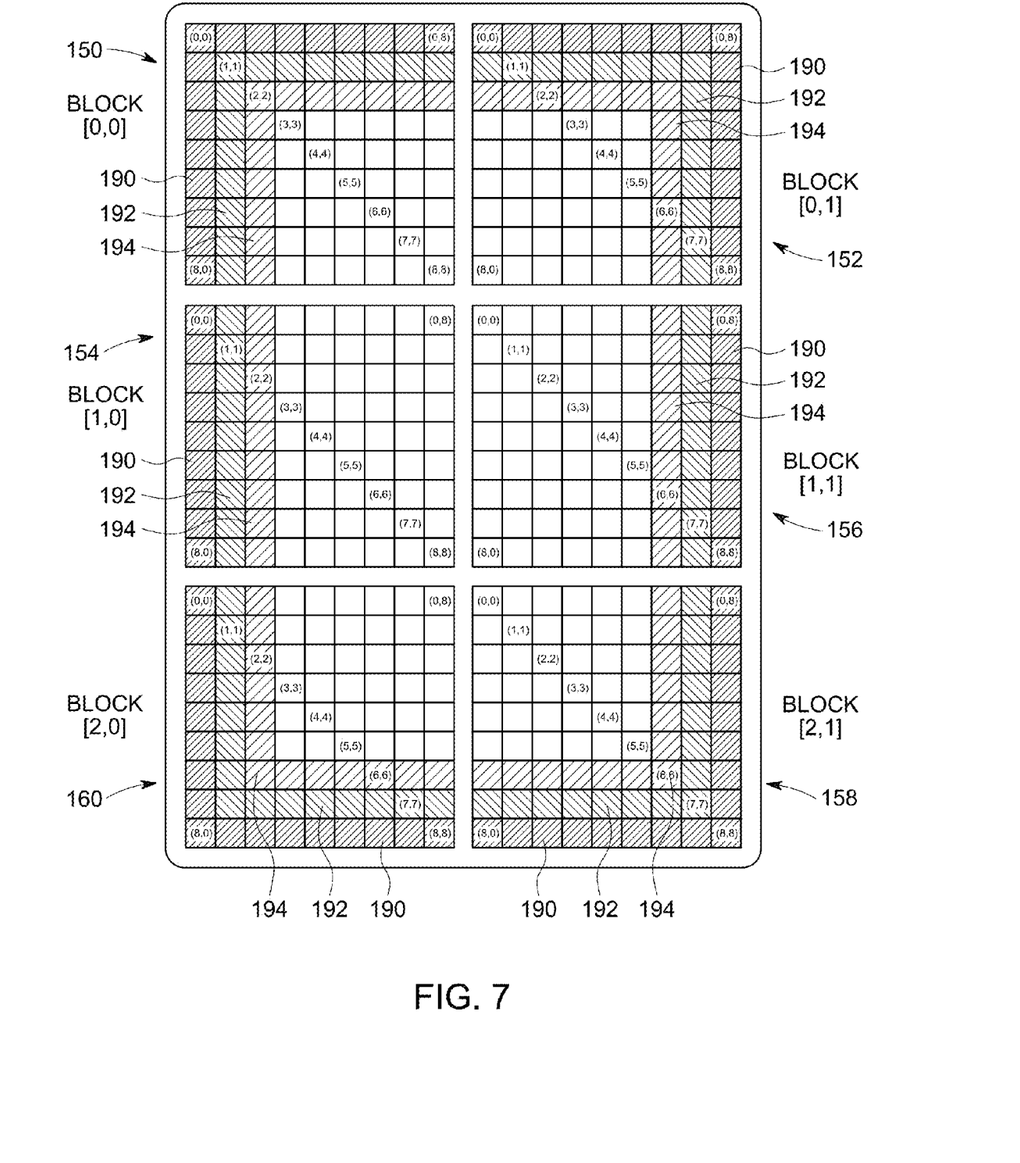
FIG. 7 is a diagram of a multi-unit detector module illustrating an embodiment for accepting inter-module scattered events for reconstitution based on a detector crystal location.

Thus, in accordance with various embodiments, and as illustrated in FIG. 6 and FIG. 7, a probability function is applied to detections in portions of rows of crystals. In these embodiments, inter-block scattering events between blocks within a module may be processed and inter-block scattering events between blocks in neighboring modules may be processed. Thus, the probability of detecting a low energy event that originated from a detector scatter between blocks in the same module is greater for crystals identified in perimeter row 180 (which may extend along one, two, three or all four sides of a detector unit) than for crystals in the perimeter row 182, whose probability is greater than the crystals in perimeter row 184. Likewise, the probability of detecting a low energy event that originated from a detector scatter between blocks in neighboring modules is greater for crystals identified in perimeter row 190 than for crystals identified in the perimeter row 192, whose probability is greater than that of crystals in perimeter row 194.

Thus, the low energy events in perimeter row 180 may be weighted more than the low energy events in perimeter row 182, which are weighted more than the low energy events in perimeter row 184, which are weighted more than the low energy events in the rest of the crystals in a block. In the illustrated embodiment, the number of low energy events that are forwarded for further processing may be reduced. For example, only low events exceeding a predetermined weighting threshold may be forwarded. In addition, the number of low energy events that need to be forwarded to a neighboring module for further processing also may be reduced. For example, only low energy events in the perimeter regions 290, 292, and 294 may be forwarded and these events only need to be forwarded to the nearest neighboring module. It should be noted that there is some overlap in the perimeter rows in FIGS. 6 and 7. Therefore, some low energy events in a module may need to be compared with low energy events forwarded from a neighboring module.

It also should be noted that in some embodiments, low energy event candidates are not forwarded for the perimeter crystals where there is no adjacent detector.

Referring again to the method 50 of FIG. 1, thereafter, a determination is made at 56 as to which of the low energy events belong to given inter-block scatter events. Event (a) is identified as an inter-block scatter event with low energy events in crystals 130 and 132, and event (c) is identified as an inter-block scattering event with low energy events in crystals 140 and 142. Accordingly, various embodiments filter inter-block detector scatter events from sets of low energy events in two or more blocks that are uncorrelated and do not belong to a inter-block scattering. In addition, various embodiments filter out inter-block scattering events whose total energy are low and correspond to the initial gamma ray being scattered before reaching the detector.

For example, different thresholding and criteria may be used in the determination at 56, such as identifying inter-block detector scatter events occurring within a selected timing window or inter-block detector scatter events having a summed energy level that is close to 511 keV within a selected window.

Signal amplitude dependent shift in the measured time for the event can occur. In some embodiments, the measured time for a low energy event is corrected for this signal amplitude dependent shift in the measured time. The signal level correction of the timing of an event can either be measured directly (see, e.g., Maurizo Conti and Harold *Time Resolution for scattered and unscattered coincidences in a TOF PET scanner*, 2009 IEEE Nuclear Symposium Record) or calculated from the shape of the event pulse and a model of the circuit used to generate the time measurement. Depending on the embodiment, the correction can be made on the low energy event data at step 52, before the event is forwarded to step 56 or in step 56 as part of the determination of the time difference between low energy events. Thus, in the example illustrated in FIG. 4, the low energy events associated with events (a) and (c) are evaluated to determine whether events (a) and (c) should be reconstituted as valid 511 keV events. For example, a determination is made as to whether the events (a) and (c) are low energy events with a difference between them that is within a predetermined time period, such as, simultaneously (or within a selected timing window), were detected in neighboring detector units, and the summed energies of the detections are close to 511 keV (within a selected window). As an example, two detected events may have energies of 300 and 210, respectively, which would satisfy the summed energies threshold.

Figure 11:
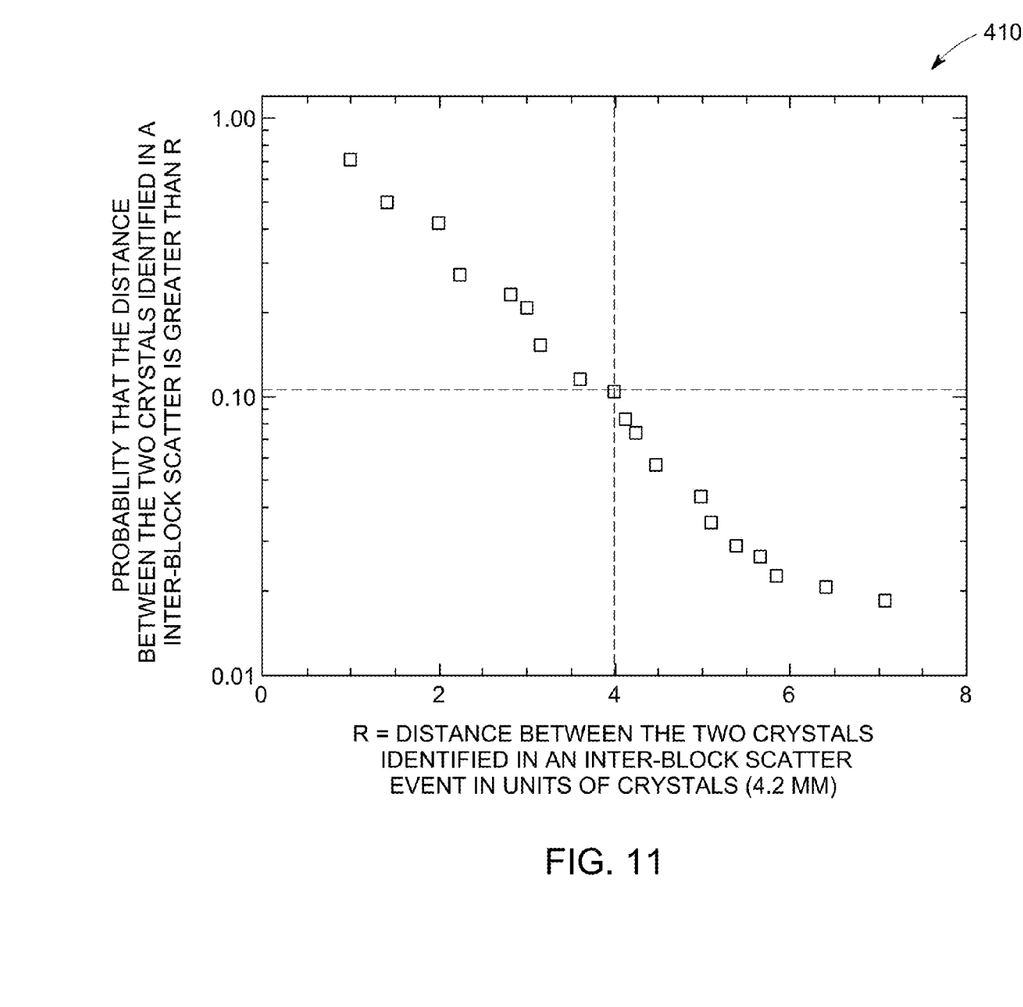
FIG. 11 is a plot of the probability that the distance between two crystals identified in an inter-block scatter is greater than a given distance.

It should be noted that other criteria may be used to determine whether the detector scatter event should be reconstituted as a valid event, such as the distance between the crystals in that the low energy event was detected. FIG. 11 is a graph 410 that shows the probability that a distance greater than a given distance separates inter-block scatter events. As shown, inter-block scattering events are more likely to produce low energy that are separated by a small distance than to create low energy events separated by a large distance. For example, only inter-block scatter events with low energy events separated by less than a predetermined value are accepted and forward for further processing. The data is again from the Monte Carlo Calculation described above.

In the above described event processing, the various tests or criteria used to determine if a low energy event is part of an inter-block event may be a binary test. A low energy event passes the test and is forwarded for further processing, or the event fails the test and is rejected. In other embodiments, a score is assigned at each test that is related to the probability that the low energy event is part of an inter-block scatter event. In various embodiments, the lower the weight, the smaller the probability that the event is part of an inter-block scatter event. At the completion of a test, the weight from that test is combined with weight from earlier tests to provide an accumulative weight for the low energy event. If the accumulative weight falls below a predetermined value, the event is rejected and no further processing is performed for that event.

The reconstitution of detector scatter as valid events (e.g., summed energy ~511 keV and in-coincidence, and detected in adjacent units) in accordance with various embodiments, is, thus, not applied to non-detector scatter, and/or random occurrence of scatter originating from different gamma for typical clinical imaging.

Figure 5:
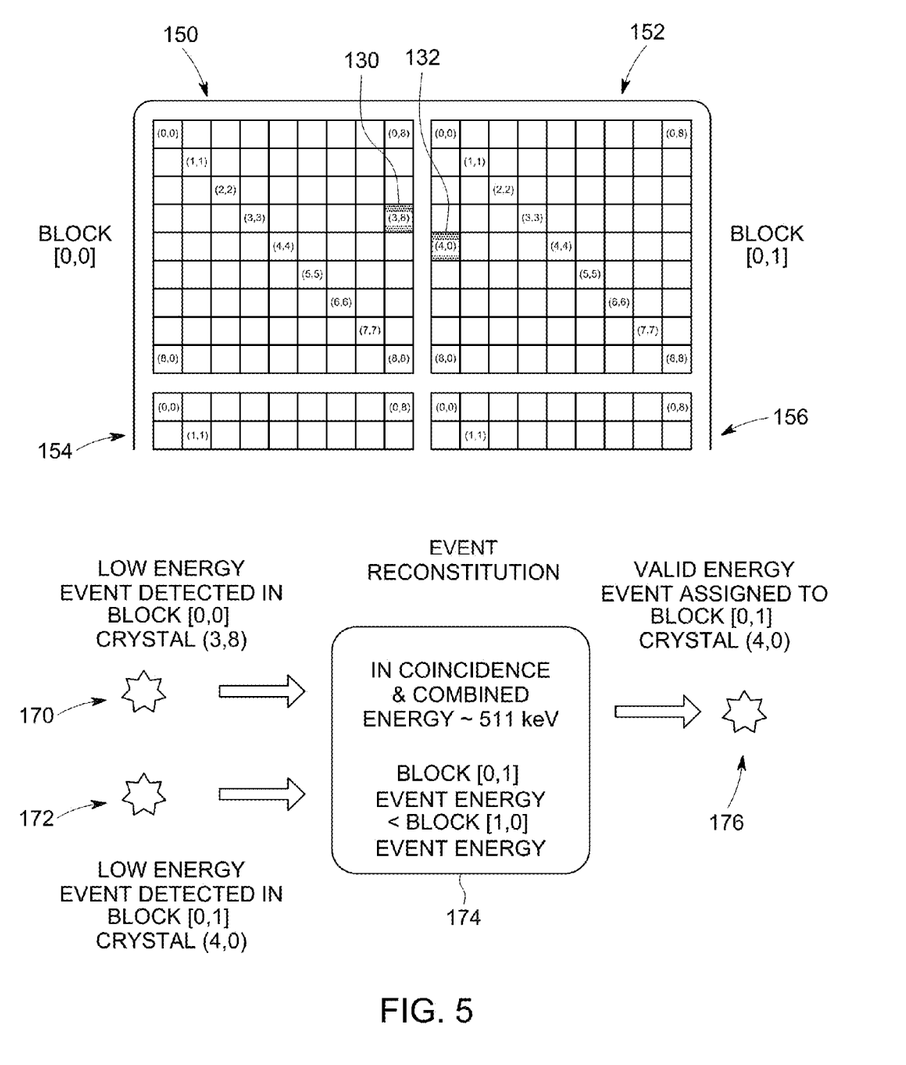
FIG. 5 is a diagram illustrating detector scatter event reconstitution in accordance with various embodiments.

Referring again to the method 50, thereafter, the inter-block scatter events identified for reconstitution are reconstituted into single valid events at 60. For example, as shown in FIG. 5, wherein units 150 and 152, and portions of units 154 and 156 are illustrated, the two low energy events 170 and 172 detected at crystals 130 and 132 that meet the reconstitution criteria are reconstituted as a valid energy qualified single event and forwarded to a system coincidence processor 174 for prompts generation as described in more detail herein. As part of the event reconstitution, the new single event's unit ID, the crystal within the unit ID, and the time stamped for coincidence compare, are assigned. If the energy of the valid singles event 176 is required for subsequent phases of the acquisition process, then the new energy of the event is the sum of the two low energy events 170 and 172 that were reconstituted.

Figure 12:
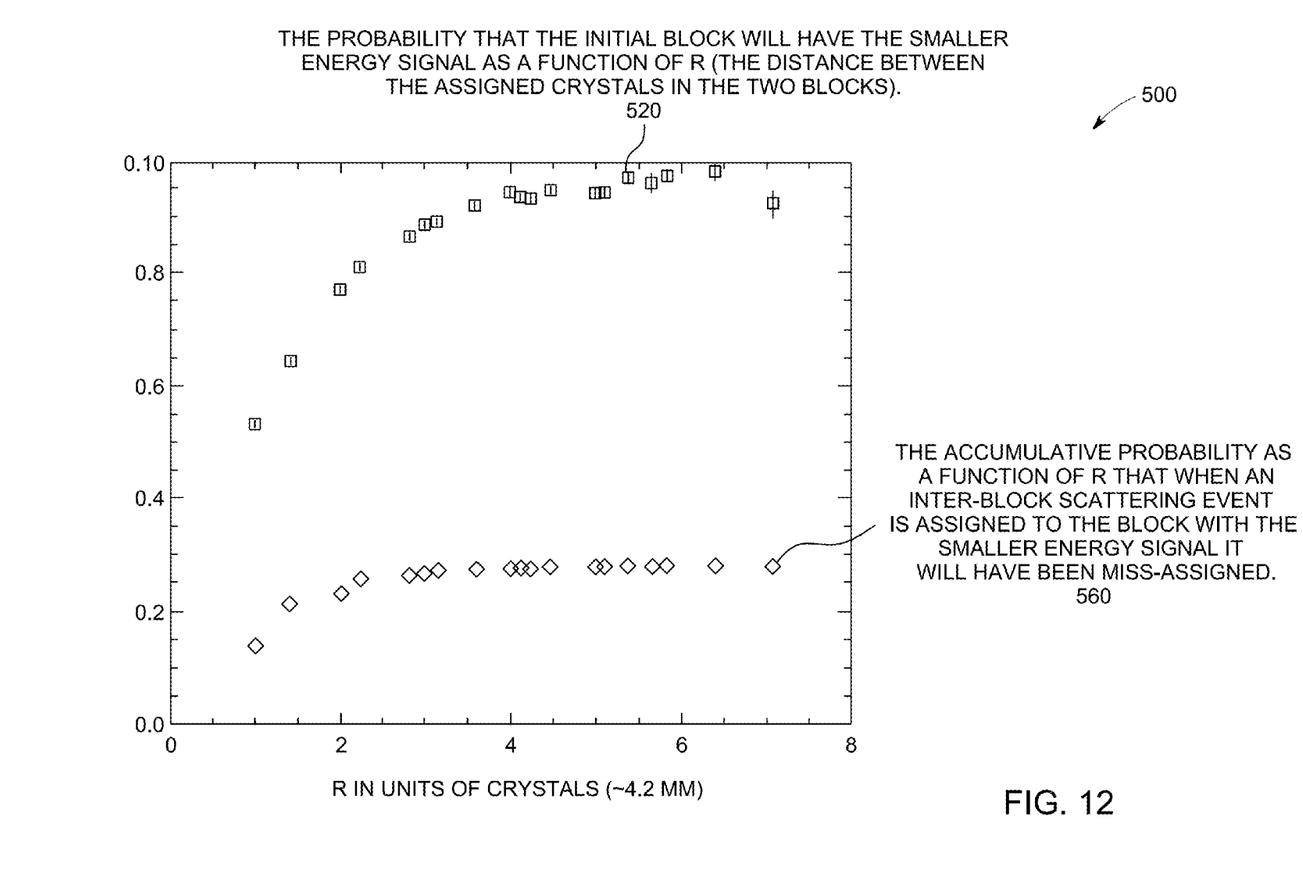
FIG. 12 are plots of the probability that an initial detector block will have a smaller energy signal and the accumulative probability that when an inter-block scattering event is assigned to the block with the smaller energy signal the block is miss-assigned.

For example, in various embodiments, the reconstituted valid events, which is based on two (or more) identified inter-block low energy events, are evaluated to determine which crystal detected the gamma first. It should be noted that the amount of energy lost is generally related to scatter angle. FIG. 12 is a graph 500 that illustrates the probability (as a function of distance between the crystals of an inter-block scatter) that the low energy event in a inter-block scattering event with the smallest energy (identified as the plot 520) is the event that corresponds to the initial gamma ray interaction in the detector, and the low energy event with the larger energy (identified as the plot 560) corresponds to the detection of the inter-block scattered gamma ray. As can be seen, the event with the lowest energy is the event most likely to correspond to the initial gamma ray interaction in the detector at all distances. The data is from the Monte Carlo Calculation described above.

Furthermore, the probability increases rapidly with the distance between the low energy events. Therefore, when the lower energy event is not associated with the first interaction with the original gamma ray, the distance between events will tend to be small and the resulting positioning error will be reduced or minimized. It should be noted that in various embodiments, the crystal having the lowest energy absorbed is identified as the first crystal to detect the gamma. Accordingly, this crystal is identified as the crystal of the reconstituted event and is used in the determination of the line or response (LOR) of any coincidence pair formed with the reconstituted event.

The time of the gamma ray interaction is used in all PET to determine which gamma rays were in coincidence and create and determine the LOR for the coincidence event. In some PET scanners, the time-of-flight information, which identifies the difference in time of detection that resulted from the positron annihilation event being detected, as is known in the art, may be used to improve the imaging capability of a scanner. The distance between the various crystals in a inter-block event is very small and the time difference between the detection of the low energy events is insignificant. Accordingly, the relative time stamp of the any of the low energy events in a inter-block scatter event can be used for the reconstituted event. In general, the time stamp of the low energy event with the highest energy has the smallest uncertainty, and the time stamp for that event is used. In general, any suitable method may be used to reconstitute the low energy events to the single valid coincidence event. For example, in some embodiments, wherein low energy gamma events are detected, the timing for the reconstituted valid gamma event is based on the weighted average of the timing for the two low energy gamma events. The weight for the weighted average may be based on an energy level of each of the two low energy gamma events. In other embodiments, the weight for the weighted average may be based on an energy level of each of the two low energy gamma events and the timing resolution of the crystal to which each of the two low energy gamma events is assigned. The dependence of the timing resolutions of the crystals can be either calculated from a model of the event pulse shape and the circuit that determines the time of the event, or it can be measured using the methods in the art (e.g., Maurizo Conti and Harold Time Resolution for scattered and unscattered coincidences in a TOF PET scanner, 2009 IEEE Nuclear Symposium Record).

It should be noted that it is assumed that in various embodiments the detector is calibrated with respect to gains, position map, per crystal energy discrimination and timing prior to performing the methods described herein. Thus, the method 50 is disabled for the detector calibration mode.

In accordance with various embodiments, variations and modifications are contemplated. In some embodiments, the methods may be implemented in local versus centralized processing to simplify the implementation logic and minimize data distribution bandwidths. These embodiments may be implemented, for example, for "Energy Discrimination first then Coincidence" architectures. In some embodiments, the order of the processing steps may be different. For example, the timing of low energy events may be evaluated first so that only the low energy events that are in coincidence with another low energy event is evaluated for energy, and position requirements.

Figure 8:
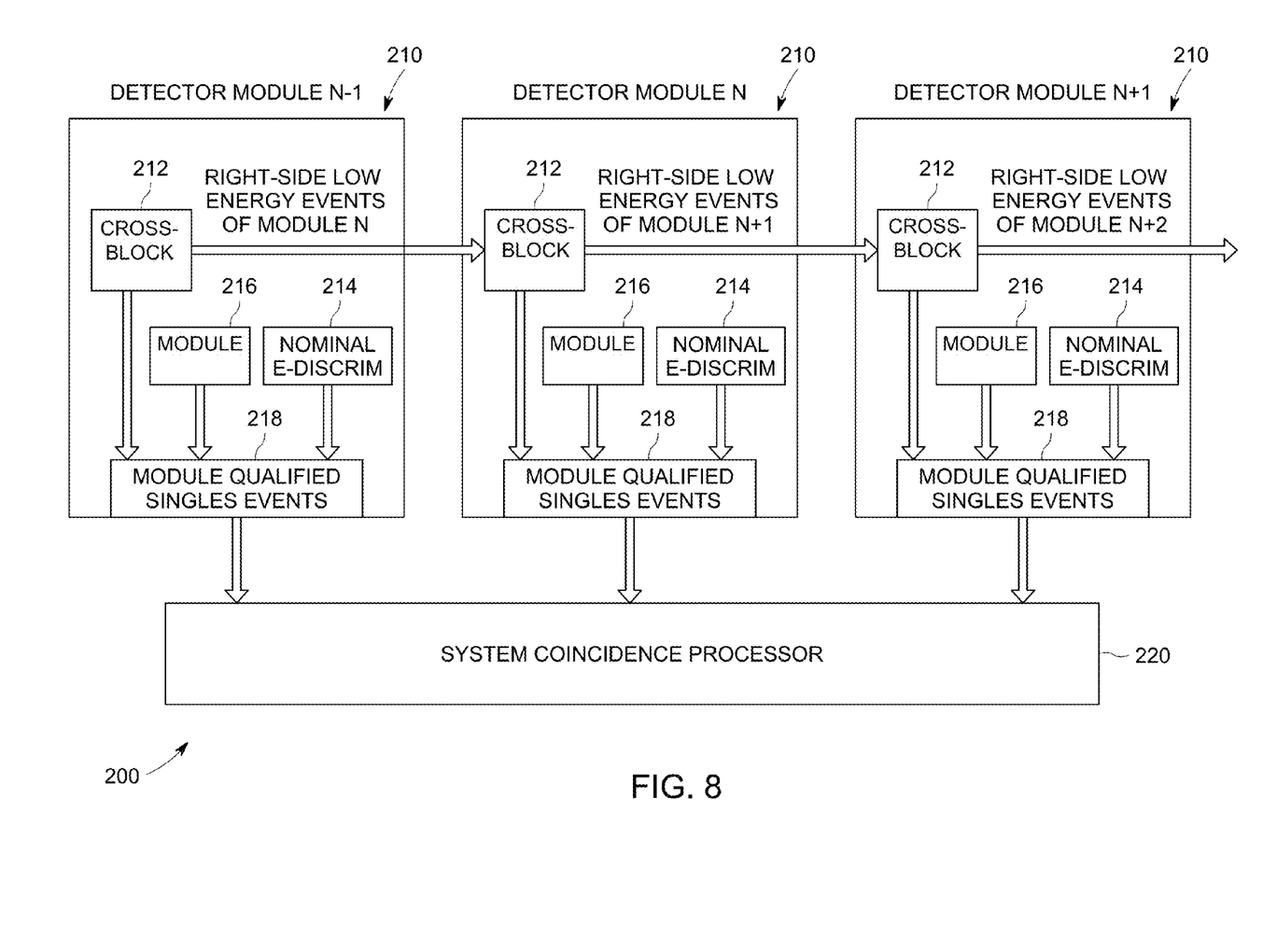
FIG. 8 is a block diagram of an inter-module architecture formed in accordance with various embodiments.

In various embodiments, a cross-module implementation includes each module in the detector ring forwarding inter-block low energy event candidates to the neighbor modules. For example, inter-block low energy events from the right side of the detector module 1 are forwarded to the detector module 2, which is adjacent to the right side of module 1. Module 2 then identifies detector scatter events for reconstitution. For example, a cross-module architecture 200 is illustrated in FIG. 8 having a plurality of detector modules 210 each having an inter-module 212 for communicating cross-block low energy events candidates to adjacent detector module 210 may be provided. Each detector module 210 also includes a nominal E-Discrimination module 214 and processing module 216 that implement, for example, the method 50 to reconstitute valid events that are communicated from a qualified singles events module 218 to a system coincidence processor 220 that maintains counts for use in reconstructing images.

Thus, in accordance with various embodiments, detector scatter events (e.g., two low energy detected events) are reconstituted for use as valid gamma photon counts that may be used for image reconstruction. The reconstitution is performed on detector scatter events that satisfy certain criteria.

The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for detector scatter recovery acquisition, the method comprising:
   identifying detected gamma events in different multi-crystal detector units of a nuclear medicine (NM) imaging detector;
   determining whether the detected gamma events occurred within different ones of the multi-crystal detector units, wherein detected gamma events in the different multi-crystal detector units having a predetermined time period and a summed energy of at least a predetermined level defining gamma events for reconstitution;
   rejecting gamma events for reconstitution based on a position of the gamma events in the detector units; and
   reconstituting the defined gamma events into single valid gamma events.

2. A method in accordance with claim 1 wherein the detected gamma events comprise low energy gamma events and the determining comprises determining whether the summed energy is at least about 511 keV.

3. A method in accordance with claim 1 wherein the detected gamma events comprise low energy gamma events and the determining comprises determining whether the summed energy is between about 425 keV and about 650 keV.

4. A method in accordance with claim 1 wherein the determining comprises determining whether the predetermined time period is within a window for a coincidence event.

5. A method in accordance with claim 1 wherein the detected gamma events comprise low energy gamma events and a position of a corresponding detected annihilation event is defined as a position in the detector unit detecting the gamma event of the low energy gamma events having the lowest energy level.

6. A method in accordance with claim 1 further comprising rejecting gamma events for reconstitution based on the energy of the gamma events in the detector units.

7. A method in accordance with claim 1 further comprising rejecting gamma events for reconstitution based on an energy and a position of the gamma events in the detector units.

8. A method in accordance with claim 7 wherein the multi-crystal detector units comprises a plurality of crystals and further comprising accepting gamma events for reconstitution if the gamma events are detected by edge crystals of the detector units.

9. A method in accordance with claim 1 wherein the detected gamma events comprise low energy gamma events and a pair of low energy gamma events is rejected for reconstitution based on a distance between the detected low energy gamma events.

10. A method in accordance with claim 1 wherein the detected gamma events comprise low energy gamma events and a timing for the reconstituted valid gamma events is based on the weighted average of a timing for the low energy gamma events.

11. A method in accordance with claim 10 wherein a weight for the weighted average is based on an energy level of each of the low energy gamma events.

12. A method in accordance with claim 10 wherein the multi-crystal detector units comprise a plurality of crystals and a weight for the weighted average is based on an energy level of each of the low energy gamma events and a timing resolution of the crystal to which each of the low energy gamma events is assigned.

13. A method in accordance with claim 1 wherein the different detector units comprise adjacent detector units in a multi-unit detector module.

14. A method in accordance with claim 1 wherein the multi-crystal detector units comprise a plurality of crystals and the identifying comprises identifying detected gamma events within a predetermined number of rows of crystals within each of the different detector units.

15. A method in accordance with claim 1 the identifying comprises identifying a scattered gamma event detected by two adjacent detector units.

16. A nuclear medicine (NM) imaging system comprising:
   an imaging portion comprising a plurality of multi-unit detector modules for detecting gamma events and each having a plurality of detector units, each of the multi-unit detector modules further includes an array of scintillator crystals, light sensor devices, and event detection circuitry; and
   a processing portion configured to identify scattered gamma events based on a position, time and energy of the scattered gamma events in two detector units, reject gamma events for reconstitution based on a position of the gamma events in the two detector units, and reconstitute the scattered gamma event as a valid gamma event.

17. An NM imaging system in accordance with claim 16 further comprising a localized set of electronics for each of the plurality of multi-unit detector modules configured to identify the two scattered gamma events based on a position, time and energy of the two scattered gamma events in two adjacent detector units.

* * * * *